United States Patent [19]

Puzrin et al.

[11] Patent Number: 4,886,203

[45] Date of Patent: Dec. 12, 1989

[54] METHOD OF PRODUCING BY BRAZING BIMETALLIC CYLINDRICAL ARTICLES

[76] Inventors: Leonid G. Puzrin, ulitsa Tarasovskaya, 18, kv. 17, Kiev; Miron G. Atroshenko, ulitsa Yakira, 21, kv. 12, Kiev; Vladimir L. Yaremenko, ulitsa Moskovskaya, 5, kv. 18, Kiev; Jury Y. Ischenko, Fastovsky raion, poselok Borovaya pereulok Krasny, 7, Kievskaya oblast; Pavel S. Nefedov, ulitsa Kazantseva, 18a, kv. 25, Donetskaya oblast, Zhdanov; Ivan G. Pescherin, prospekt Metallurgov, 199, kv. 33, Donetskaya oblast, Zhdanov; Ilya P. Serebryanik, ulitsa K. Libknekhta, 98, kv. 2, Donetskaya oblast, Zhdanov; Evgeny I. Polev, prospekt Illiicha, 52, kv. 57, Donetskaya oblast, Zhdanov, all of U.S.S.R.

[21] Appl. No.: 184,089

[22] Filed: Apr. 20, 1988

[51] Int. Cl.$^4$ .................. B23K 31/02; B23K 31/06
[52] U.S. Cl. .................... 228/126; 228/133; 228/134; 228/151; 228/173.4; 228/173.6; 228/186; 228/189; 29/523; 138/142; 219/59.1
[58] Field of Search ............. 228/126, 132–134, 228/151, 173.4, 173.6, 182, 184, 186, 189, 175; 29/523; 219/59.1; 138/142

[56] References Cited

U.S. PATENT DOCUMENTS 3,078,551  2/1963  Patriarca et al. ................ 228/134
3,370,930  2/1968  Fickett et al. ................... 228/134
4,765,529  8/1988  Turner ........................... 228/186

FOREIGN PATENT DOCUMENTS 8459  4/1979  Japan ............................ 228/189

OTHER PUBLICATIONS

"Technologia Elektricheskoi", 1974.
"Avtovakuumnaya", L. G. Puzrin et al., 1975.
"Spravochnik po paike", 1984.

Primary Examiner—Nicholas P. Godici
Assistant Examiner—Samuel M. Heinrich
Attorney, Agent, or Firm—Lilling & Greenspan

[57] ABSTRACT

A method of brazing of an outer carbon steel shell to an inner stainless steel shell, in which a stainless steel sheet material of the inner shell is rolled up with an overlap and arranged with a clearance inside the outer shell, braze material is placed in the clearance, walls of the rolled sheet material of the inner shell are forced to the inner surface of the outer shell, longitudinal edges of the sheet material of the inner shell are weld-joined to form the inner shell, air is evacuated from the clearance, and ends of the outer and inner shells are joined by circular vacuum-tight corner welds, one leg of which extends radially and has a length equal to at least one thickness of the inner shell, whereas the length of the other leg, which extends longitudinally, is equal to at least twice the thickness of the wall of the inner shell and said inner and outer shells are brazed in a furnace forming after cooling a bimetallic cylindrical article.

10 Claims, 2 Drawing Sheets

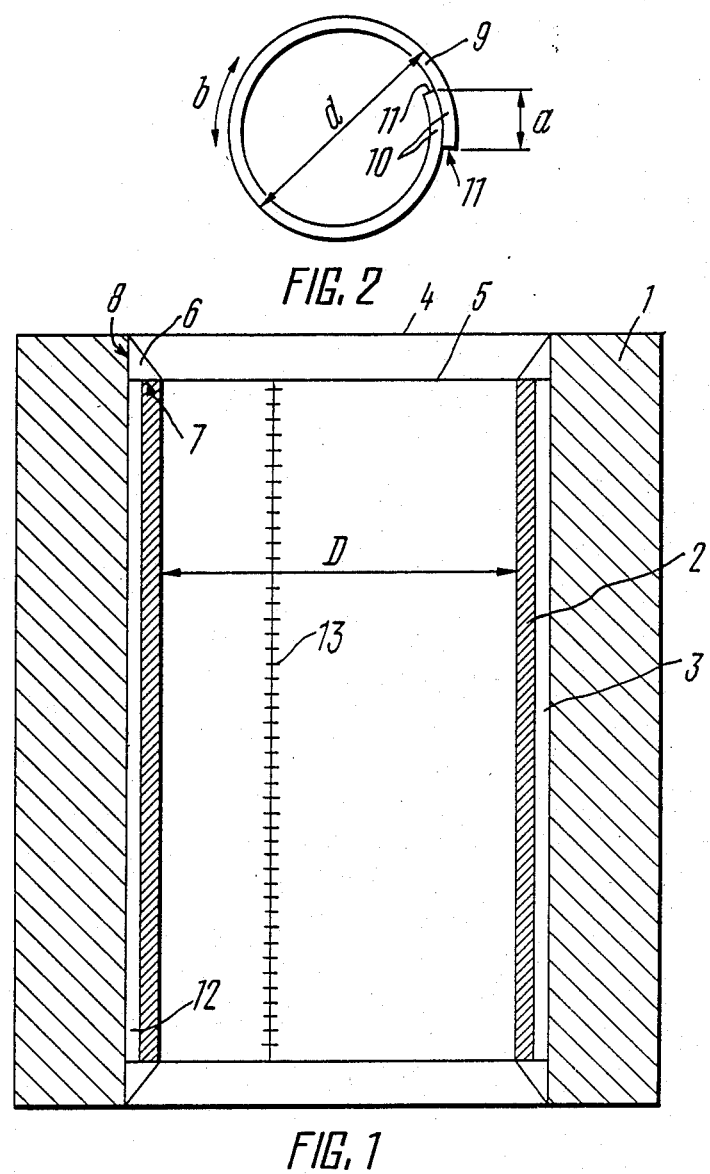

METHOD OF PRODUCING BY BRAZING BIMETALLIC CYLINDRICAL ARTICLES

BACKGROUND OF THE INVENTION

1. Field of the Invention

This invention relates generally to the art of making bimetallic articles and, more particularly to furnace brazing of two shells with the aim of obtaining a bimetallic cylindrical article. Still more particularly, it relates to a method of brazing of two shells of large diameter viz., a thick-wall outer shell and a thin-wall inner shell.

The invention can find application in the power chemical and petrochemical engineering fields for the production of a large range of vessels, reactors, tubes and pipes.

2. Description of the Prior Art

There is known a method of making bimetallic articles by electric arc deposition (cf., e.g. "Tekhnologia electricheskoi svarki metallov i splavov plavleniem", in Russian, edited by B.E. Paton, 1974, the Masninostroenie Publishers, Moscow, pages 694, 726 to 728), in which a coat layer is applied in several paths by electric arc deposition with wire or tape electrodes and with preliminary and accompanying heating of the article, if base materials used are steels susceptible to cracking during deposition, after which the surface of the layer thus applied is subjected to mechanical machining.

One advantage of this method is obtaining of a reliable bond between the base metal and coat layer, as well as the possibility of applying a coat of a corrosion-resistant layer to cylindrical articles such as cylindrical shells. However, the process of applying a stainless steel coating by electric arc deposition is inefficient and labor-consuming. Other disadvantages are associated with an immediate proximity to the operator of a large mass of heated metal. The layer applied by such a method is non-uniform in thickness and includes flaws in the form of slag, pores and cracks. In addition, the method fails to provide stable corrosion-resistant properties of the deposited layer. There is also known a method of brazing large size cylindrical workpieces (cf., L.G. Puzrin, et al "Avtovakuumnaya vysokotemperaturnaya paika", 1975, the Znanie Publishers, Kiev, pages 8 to 10, in Russian), in which cylindrical pieces are assembled before brazing by arranging one piece in another with a non-capillary clearance over which a braze material is placed. The clearance must necessarily be non-capillary, that is one in which the braze material would be capable to flow under the effect of its own weight, rather than under the action of capillary forces. It is well known (cf., "Spravochnik po paike" edited by I.E. Petrunin, 1984, the Mashinostroenie Publishers, Moscow, page 21), that in a capillary clearance the molten braze material fails to flow to a desired depth, and therefore the clearance must be non-capillary to facilitate penetration of the braze material.

There is a known method (cf., U.S. Pat. No. 3,370,930) bearing the closest resemblance in terms of the technical essence and results obtained to the herein proposed method and used for brazing together a carbon steel outer shell and a stainless steel inner shell, the wall thickness of the outer shell being tens of times the wall thickness of the inner shell. This method is normally used for making large size bimetallic cylindrical articles. The assembly of such an article requires that the thin inner stainless steel shell be preliminarily formed. As the inner shell can be used a section of a pipe or it may be fabricated or by rolling up a stainless steel sheet material, joining its longitudinal edges by a straight weld, and thereafter machining its outer surface. This inner shell is then arranged with a clearance inside the outer carbon steel shell and this clearance being filled with a foil braze material attached to the outer surface of the inner shell. The width of the clearance between the shells is preselected so that between the inner surface of the outer carbon steel shell and the layer braze material there would be a free space of a width equal to the difference in the radial thermal expansion of the shells during subsequent heating, the stainless steel inner shell having a higher coefficient of thermal expansion, than the outer carbon steel shell.

The ends of the shells are joined by vacuum-tight welds through resilient ring elements (compensators) allowing in the course of heating for axial displacement of the ends of the inner shell relative to the outer shell due to the difference in thermal elongation in this axial direction. Air is evacuated from the closed space, that is from the clearance between the carbon steel outer shell and stainless steel inner shell having a layer of braze material applied thereto, the assembly is thereafter heated in a furnace to the brazing temperature, while the gases are being evaluated from the clearance between the inner and outer shells by a vacuum pump. In the course of heating the clearance between the outer shell and the braze material is gradually diminishing, and the shells press each other through the layer of braze material, whereas the provision of resilient ring elements affords free elongation of the inner thin-wall stainless steel shell in the axial direction. Upon attaining the brazing point, the braze material melts to bond the surfaces of the shells, and thereafter the assembly is cooled.

The need for the highly accurate annular clearance between the outer and inner shells is mainly dictated by the preferred assembly procedure during which the finished stainless steel inner shell is arranged inside the carbon steel outer shell, the magnitude of this clearance being strictly limited by the difference between the radial thermal expansion of the shells. In order to obtain the annular clearance of a predetermined uniform width through the whole length of the shells it is necessary to meet certain conditions, each of which may pose a certain technological problem. Such conditions are:

- highly accurate finish of the surfaces being bonded together both in terms of shape and dimensions, which is especially difficult with respect to the stainless steel inner shell, which is not rigid enough since its diameter exceeds by far its wall thickness;
- evacuating air from the clearance during heating, which is rather inconvenient and technologically difficult, since it requires the provision of a special furnace with conduits connecting the assembly to a vacuum pump and poses extra difficulties associated with placing the assembly into the furnace for brazing;
- high accuracy of the assembly procedure which is still more complicated due to the use of the resilient ring elements necessitating a large number of vacuum-tight welds, which makes the assembly procedure still more labor consuming, and also due to maintaining an equal magnitude of clearance between the surfaces to be brazed, a fault of which results in brazing flaws at the side of excessive clearance. All the aforedescribed conditions overcomplicate the prior art method of brazing, which limits the range of its industrial applications.

This method sometimes fails to ensure high quality of the brazed joint due to residual stresses and possible ruptures of the brazed seam caused by the tendency to axial displacement of extreme portions of the stainless steel inner shell relative to the carbon steel outer shell during contraction after cooling, which is especially characteristic for elongated shells.

Furthermore, incomplete mating of the inner shell with the outer shell causes lack of brazing which affect the quality of the brazed structure. When making use of braze material containing such volatile components as manganese and zink, poor brazing may take place due to increased melting temperature and reduced spreading of braze material caused by the entrainment of such components during the evacuation of gases in the course of heating.

SUMMARY OF THE INVENTION

It is an object of the present invention to provide such a method of brazing of an outer carbon steel shell to an inner stainless steel shell, which improves the quality an mechanical strength of the brazed joint between them by obviating their mutual displacement and ensuring their tight engagement during brazing and subsequent cooling.

Another object is to provide a method of brazing of an outer carbon steel shell to an inner stainless steel shell by automatic vacuum welding, in which the procedures of assembling and weld-joining of the inner and outer shells are simplified, the amount of labor consumed for assembling the shells is reduced by obviating the need for maintaining an accurate clearance between the shells through the whole of their length, and by reducing the number of weld-joints.

One more object is to provide a method of brazing of an outer carbon steel shell to an inner stainless steel shell enabling one to expand the range of braze materials to be employed by providing capabilities for making use of braze materials containing volatile components.

The object of the invention is attained by a method of brazing of an outer carbon steel sell to an inner stainless steel shell comprising the steps of arranging the inner shell with a clearance inside the outer shell, the inner shell being preliminarily formed by rolling up a stainless steel sheet material, placing a braze material, joining ends of the outer and inner shells by vacuum-tight circular welds, evacuating air from the clearance between the inner and outer shells, heating for brazing, and cooling. According to the invention, the sheet material of the inner shell is rolled up with an overlap, the rolled up sheet material is placed inside the outer shell, the walls of the rolled sheet material are forced to the inner surface of the outer shell, and longitudinal edges of the inner shell are joined by a straight weld, whereas the vacuum-tight circular welds are made in the form of corner welds.

Preferably, in the method according to the invention on the vacuum-tight circular welds have legs with the length of one such leg, which extends radially, equalling at least one thickness of the wall of the inner shell, whereas the length of the other leg, which extends longitudinally, equals to at least twice the thickness of the wall of the inner shell.

Advisably, in the proposed method, the outer and inner shells are disposed vertically, the bgraze material is placed at the upper portion of the outer shell at the level of the top end of the inner shell, the clearance between the outer shell and rolled up sheet material of the inner shell is filled prior to weld-joining with a mesh of steel wire having a diameter of at least 0.25 mm, and air is evacuated from the clearance prior to heating for brazing.

Preferably, in the proposed method, that when using copper as the braze material, the diameter of steel wire of the mesh is within a range from 0.25 mm to 1 mm.

Alternatively, when using as braze material an alloy containing 60% manganese and 40% nickel, the diameter of the steel wire is to be within a range from 0.36 to 1.2 mm.

Advisably, in the proposed method, when using as braze material an alloy containing 75% manganese, 15% nickel, and 10% copper, the diameter of steel wire of the mesh ranges from 0.32 mm to 1.0 mm.

The proposed method of brazing makes it possible to considerably improve the quality of a brazed joint between the outer and inne shells and increase its mechanical strength. This is attained by the fact that when the sheet material of the inner shell rolled up with an overlap is placed inside the outer shell and its wall are forced to tightly engage through the layer of braze material with the inner surface of the outer shell without voids or pockets, mutual displacement of the shells during brazing and cooling is prevented.

In the proposed method of automatic vacuum brazing the procedures of assembling and weld-joining the inner and outer shells are simplified, and the amount of labor required for the assembly is reduced, because the sheet material of the inner shell rolled up with an overlap is placed inside the outer shell, whereas weld-joining of the longitudinal edges of the inner shell is done after forcing its walls to the inner surface of the outer shell, which allows one to dispense with overcomplicated process conditions associated with keeping the clearance between the outer and inner shells up to the predetermined magnitude through their whole length; the number of weld joints is also reduced, as it is necessary to make only one longitudinal weld to joining the longitudinal edges of the sheet material and two circular vacuum-tight welds to joining the ends of the outer and inner shells without attaching resilient ring elements.

Making the circular vacuum-tight welds in the form of corner welds, i.e. having in the longitudinal section the form of triangles with legs of predetermined length, makes it possible to increase the mechanical strength of the assembly, which eventually improves the quality of the brazed joint and increases the reliability of the bimetallic tubular article produced by the proposed method of automatic vacuum brazing.

The method of automatic vacuum brazing according to the invention allows one to dispense with evacuating air from the clearance between the outer and inner shells, carried out in the prior art methods by evacuation or pumping out gases during brazing, whereby it becomes possible to make use of braze materials containing volatile components, in other words, to expand the range of braze materials which may be employed for carrying out the method.

The aforedescribed is attained by complete evacuation of air from the clearance as the inner shell is intimately pressed to the outer shell, and by joining the ends of the outer and inner shells prior to brazing by circular vacuum-tight corner welds.

In addition, the reduction in the number of welds ensures a higher reliability of the proposed method of automatic vacuum brazing due to the fact that such welds are less susceptible to the loss of sealing capacity during brazing and cooling, whereas the mechanical strength of the circular vacuum-tight welds is increased because they have the form of corner welds.

The proposed method of automatic vacuum brazing also increases the reliability of the brazing process and of the brazed joint between the outer and inner shells through reducing the number of welds and increasing their mechanical strength, because the method only needs making two circular vacuum-tight welds having in a longitudinal section the form of a triangle with legs of a predetermined length. Connection of the ends of the outer and inner shells by corner welds in which the leg adjacent to the inner thin-wall shell has a length equal to its thickness, and the leg adjacent to the outer shell is equal to at least two times this thickness makes it possible to prevent the displacement of the outer shell relative to the inner shell and formation of residual stresses or ruptures of the brazed seam associated therewith.

BRIEF DESCRIPTION OF THE DRAWINGS

These and other advantages of the present invention will become more fully apparent from a more detailed description of examples of carrying out the method with reference to the accompanying drawings, in which:

FIG. 1 is a longitudinal sectional view of outer and inner shells for brazing;

FIG. 2 is an end view on a reduced scale of a sheet material roll up with an overlap;

DESCRIPTION OF THE PREFERRED EMBODIMENT

Figure 3:
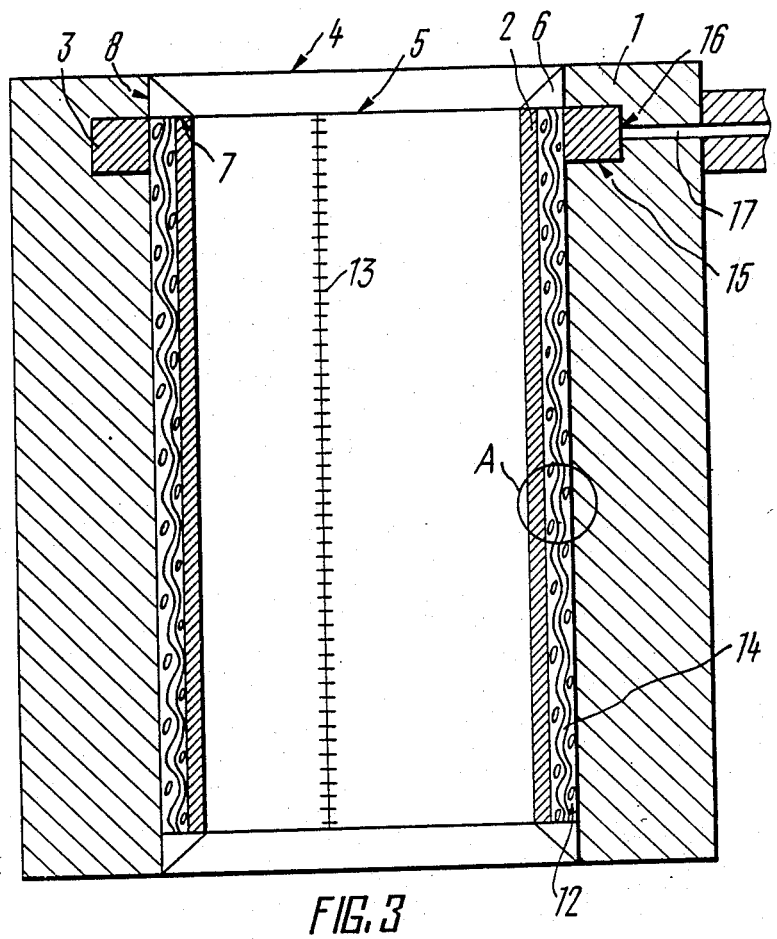
FIG. 3 is a longitudinal sectional view of the outer and inner shells with a steel wire mesh assembled for brazing.

With reference to FIG. 1, there is shown an outer shell 1 having an inner shell 2 secured therein. The outer shell 1 is fabricated from carbon steel, whereas the inner shell 2 is made of stainless steel, the wall thickness of the outer shell 1 being dozens of times the wall thickness of the inner shell 2. Provided between the outer and inner shells 1 and 2 is a layer 3 of braze material, such as an alloy containing 75% manganese, 15% nickle and 10% copper whereas ends 4 and 5 of the shells are joined by vacuum-tight circular welds 6, such as fillet or corner welds.

It is known, fillet welds are welds which in the longitudinal section have the form of a triangular. In the herein proposed invention the size of one leg 7 of the weld 6, which extends radially, equals to at least one thickness of the wall of the inner shell 2, whereas the size of another leg 8, which extends longitudinally, equals to at least twice this thickness.

When carrying out the proposed method of brazing the inner shell 2 is preliminarily formed. When doing so, a sheet of stainless steel material 9 is rolled up with an overlap. On sheet bending rolls to a diameter "d", which is somewhat less than the diameter "D" of the inner shell 2 (FIG. 1) obtained from this sheet material 9 (FIG. 2). For this purpose the sheet material 9 is rolled up in such a manner so that the portions 10 thereof adjacent the opposite longitudinal edges 11 of the sheet material 9 overlap in the zone "a" and are capable of relative displacement along the circumference of the rolled up sheet material 9 (arrow "b").

The layer 3 (FIG. 1) of braze material is applied to the outer surface of the rolled up sheet material 9 either by spraying or by tacking or spot welding a foil of braze material thereto. Application of the layer 3 of braze material can be done otherwise, such as by attaching it to the inner surface of the outer shell 1. The rolled up sheet material 9 (FIG. 2) of the inner shell is placed inside the outer shell (FIG. 1) with a clearance 12 and by using braces (not shown) the walls of the sheet material 9 (FIG. 2) of the inner shell are tightly pressed to the inner surface of the outer shell 1 (FIG. 1). As a result of this operation the longitudinal edges 11 of the sheet material 9 (FIG. 2) are spread apart (cf. arrow "b"), the zone "a" of contact is virtually eliminated, and the edges 11 are joined. Because the sheet material 9 was preliminarily rolled up with an overlap, a tight contact of the sheet 9 to the inner surface of the outer shell 1 becomes possible, and the longitudinal edges 11 of the sheet 9 (FIG. 2) are reliably brought together to facilitate the subsequent weld-joining. As the walls of the sheet material 9 are forced to the inner surface of the outer shell 1, air present in the clearance 12 is evacuated, and this clearance tends to be occupied by the layer 3 of braze material. Then the longitudinal edges 11 of sheet material 9 are joined by a longitudinal weld 13, after which the formation of the inner shell 2 is terminated.

The ends 4 and 5 of the shells 1 and 2 are joined by circular vacuum-tight welds 6, after which the outer and inner shells 1, 2 (the assembly unit) are heated to the brazing temperature which results in melting of the braze material and joining the shells 1 and 2. Brazing is followed by cooling the assembly unit and obtaining a bimetallic cylindrical article, particularly a thick-wall carbon steel tube having an inner stainless steel cladding.

EXAMPLE 1

A sheet material 9 (FIG. 2) of the inner shell made of stainless steel 5 mm in thickness, 1000 mm in width and 3140 mm in length was rolled up with an overlap to an outside diameter "d" of about 950 mm (the length of the contact zone "a", as measured along the circumference of the rolled up sheet material was about 79 mm). Tacked to the outer surface of the sheet material 9 by spot welding was a layer 3 (FIG. 1) of foil 0.3 mm thick preliminarily fabricated from a rolled ductil strip of braze material having a melting point of 1060° C. and the following composition: by weight manganese - 75%, nickel - 15%, copper - 10%.

The sheet material 9 (FIG. 2) was placed inside the outer carbon steel sheel 1 (FIG. 1) having the inside diameter of 1000 mm, in a length of 1025 mm and a wall thickness of 220 mm, after which the walls of the sheet material 9 (FIG. 2) were forced by screw clamps to the inner surface of the outer shell 1 (FIG. 1) thereby ensuring intimate contact of the sheet material 9 (FIG. 2) therewith. The longitudinal edges 11 of the sheet material 9 were butt-joined by the longitudinal weld 13 (FIG. 1). Welding was done by electrodes for welding austenitic steel. The ends 5, and 4 of the inner and outer shells 2 and 1 were joined by circular vacuum-tight welds 6 with angular legs of 5.3 mm, extending radially, that is at the side of the inner shell 2, and 12 mm, extending longitudinally, that is at the side of the outer shell 1. Welding was done by electrodes for welding steels of different compositions. The assembly unit was heated in a heat-treating furnace without protective atmosphere to a brazing temperature of 106° +20° C., and thereafter was cooled together with the furnace.

Quality of joining was tested by ultrasonic and mechanical methods.

Ultrasonic inspection was done by a test probe having a resolution capacity of 3mm². Lacks of brazing were not detected. When bend-tested with the cladding outside and inside at a bending angle of 180° no stratifications, ruptures or other defects were detected. Shear testing of the cladding of eighteen specimens resulted in the following strength coefficient:

$$\tau = \frac{310 - 380}{355} \text{ MPa; whereas tests for}$$

separation of the sladding of the eighteen samples produced the following limit strength:

$$\sigma = \frac{309 - 404}{374} \text{ MPa.}$$

These results testify to high strength of brazed joints. Macrosections showed that the joined surfaces were reliably wetted with the braze material, and that incomplete brazing was not in evidence.

Prior to developing the method of brazing with reference to Example 1 there were made a series of experiments aimed at determining the optimum parameters of the circular vacuum-tight welds 6 at the ends 4 and 5. The experiments were carried out on pilot models of coaxially assembled steel rods 2020 mm in length, 38 mm in diameter and steel pipes (sleeves) having an outside diameter 45 mm, length 2000 mm and wall thickness 3 mm.

Both ends of a pipe were joined to a rod by circular vacuum-tight welds. Welding was done by electrodes for welding steels of different compositions. The obtained assemblies were heated to 1100° C. Depending on the length of the legs of the annular vacuum-tight weld at the places of joining thereof with the rod or the tube, there showed themselves various failures done to the weld seams due to heating the assemblies and the existing difference between coefficients of thermal expansion of the materials of the rod and pipe. Test results are represented in Table I

TABLE I

| No 1 | Length of leg of the circular vacuum-tight weld, mm | | Location of failure of the annular vacuum-tight weld 4 |
|---|---|---|---|
| | radially 2 | longitudinally 3 | |
| 1 | 3 | 3 | at the place of joining with the rod |
| 2 | 3 | 6 | no failure at the point of connection with the sleeve |
| 3 | 2 | 6 | |
| 4 | 3 | 5 | |
| 5 | 2.5 | 6 | at the point of connection with the sleeve |

The experiments helped to establish the optimum length of the legs of the circular vacuum-tight corner weld 6 according to the invention; particularly, the size of the leg 7, extending radially, ought to be equal to at least one thickness of the wall of the inner shell 2, whereas the length of the outer leg 8 extending longitudinally, must be equal to at least two times the thickness of the wall of the inner shell 2.

The proposed invention makes it possible to considerably simplify brazing and increase the reliability of the brazed joint. This has been attained by simplifying the assembly of the outer and inner shells 1 and 2 dispensing with accurately maintaining the magnitude of the clearance 12 between the outer and inner shells 1 and 2. In addition, pressing the walls of the sheet material 9 (FIG. 2) of the inner shells ensures intimate contact of the inner shell 2 with the outer shell 1 through the layer 3 of braze material, thereby preventing the formation of voids or pockets. Simultaneously, air is forced from the clearance 12 whereby after joining the ends 4 and 5 of the outer and inner shells 1 and 2 by circular vacuum-tight welds the clearance 12 is hermetized, and evacuation of gases therefrom during heating for brazing becomes superfluous. This in turn ensures obtaining a strong brazed joint lacking faulty and unbrazed portions. Dispensing with evacuation of gases from the assembly during brazing affords using braze materials containing volatile constituents, in other words to expand the range of braze materials to be applied. Tight mating of the inner and outer shells 1 and 2 and the heretofore described welding of their ends 4, 5 make it possible to prevent mutual displacement of the shells 1, 2 during brazing and cooling; the length of the legs 7, 8 of the annular vacuum-tight weld 6 being such that the need for using special resilient annular elements and welding operations for joining these elements with the outer and inner shells 1 and 2, as is the case with the prototype, are obviated to result in reduced number of weld seams, and consequently in the improvement of both the method and bimetallic cylindrical article obtained thereby.

FIG. 3 shows an assembly, which includes an outer shell 1 and an inner shell 2 (a longitudinal sectional view) disposed vertically. As is the case described with reference to FIG. 1, the outer shell 1 has thick walls and is fabricated from carbon steel, whereas the inner shell 2 has thin walls and is fabricated from stainless steel. The inner shell is made from sheet material 9 (FIG. 2). However, in this embodiment a steel wire mesh is disposed between the outer and inner shells 1 and 2 (FIG. 3). Provided at the top of the outer shell 1 at the level of the upper end of the inner shell 2 is a recess in the form of an annular cavity 15 to accommodate a braze material and to be hermetically communicated via a hole 16 with a pipe 17. The outer and inner shells 1 and 2 are joined at their ends 4 and 5 by circular vacuum-tight welds 6, these welds being triangular in configuration with leg 7 thereof which extends radially being equal to at least one thickness of the inner shell 2; whereby, the circular vacuum-tight weld 6 mates with the inner shell 2 through its entire thickness; whereas longitudinally the length of the leg 8 which extends longitudinally equals to at least twice the thickness of the inner shell 2. When carrying out the proposed method, the sheet material 9 (FIG. 2) is rolled up with an overlap, such as at sheet-bending rolls, to a diameter "d", which is less than the inner diameter "D" (FIG. 1) of the outer shell 1. The mesh 14 (FIG. 3) is clamped to the inner surface of the outer shell 1 or to the outer surface of the rolled sheet material 9 (FIG. 2) of the inner shell 2. The rolled up sheet material 9 of the inner shell 2 is positioned with the mesh 14 (FIG. 3) inside the outer shell 1 and pressed by screw clamps or braces to the inner surface of the outer shell 1, whereupon the longitudinal edges 11 of the sheet material 9 are joined by a longitudinal weld 13. Then vacuum-tight circular welds 6 are made, the pipe 17 is connected to the assembly and to a vacuum pump (not shown), and air is evacuated from the clearance 12 between the shells 1 and 2, whereupon the pipe 17 is sealed by welding, and disconnected from the vacuum pump, and the assembly is heated in a furnace to the brazing temperature. After brazing the assembly is cooled to result in a bimetallic cylindrical article.

Figure 4:
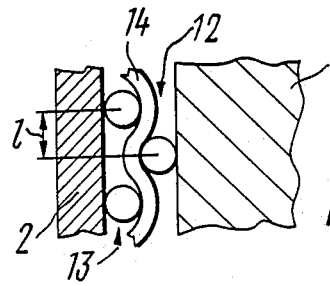
FIG. 4 shows an enlarged view of section A in FIG. 3.

With reference to FIG. 4, there is shown section A of FIG. 3, which represents a part of the clearance 12 with the steel mesh 14. It follows from the drawing that the size of he clearance 12 after pressing and weld-joining the edges 11 (FIG. 3) of the sheet material 9 (FIG. 2) is equal to two diameters of the steel wire of the mesh 14. The drawings also clearly represent the cellular structure of the mesh 14, where each cell has a width "l" approximating two diameters of the steel wire of the mesh 14.

EXAMPLE 2

Stainless steel sheet material 9 (FIG. 2) 5 mm thick, 1570 mm wide and 4416 mm long was rolled up with an overlap to an outside diameter "d" of about 1350 mm (the length of contact zone "a" close to 84 mm). The steel wire mesh 14 (FIG. 3) was tacked by spot welding to its outer surface (steel wire had diameter of 0.36 mm with cells of a size l=0.6 mm). Subsequent to placing in the annular cavity 15, a manganese-nickel based braze material containing 60 wt.% manganese and 40 wt.% nickel the rolled up stainless steel sheet material 9 of the inner stainless steel shell 2 was accommodated inside the carbon steel outer shell 1 having an inside diameter 1400 mm, height 1600 mm, and wall thickness 220 mm. The walls of the sheet material 9 were then pressed by screw clamps to the inner surface of the outer shell 1.

The longitudinal edges 11 of the sheet material 9 of the inner shell 2 were butt-joined by semiautomatic welding in the atmosphere of a shielding gas with a filling wire for welding austenitic steels, the vacuum-tight annular welds 6 (FIG. 3) being made substantially in a similar manner, but using a filling wire for welding materials of different composition. The annular welds 6 mated with the stainless steel inner shell 2 through its whole thickness (the length of leg 7 was 5 mm), whereas at the side of the outer shell 1 the leg 8 of the weld 6 was 12 mm long. Prior to heating for brazing air was evacuated from the clearance 12, whereupon the pipe 17 was sealed by welding and disconnected from the vacuum pump. The assembly was then heated in a heat-treating furnace without protective atmosphere to a brazing temperature of 1020° C., held in this temperature for 0.5 h, and cooled together with the furnace.

The quality of the brazed joint was tested by ultrasonic and mechanical methods. Ultrasonic inspection by a test probe having a resolution capacity of 23 mm² evidenced absolute continuity of the brazed joint. When bend-tested with the cladding outside and inside at a bending angle of 180° C. no stratifications, or ruptures of the joint were detected. Sixteen specimens tested for separation and shear of the cladding layer yielded the following:

$$\tau = \frac{380 - 409}{394} \text{ MPa}$$

$$\sigma = \frac{399 - 425}{412} \text{ MPa, where}$$

$\tau$, $\sigma$ are limit strengths for shear and separation respectively. Damaged areas exhibited tears-out of the base metal, which signifies that the proposed method allows to obtain a practically full-strength brazed connection. As compared to the heretofore described Example 1, a higher strength of joining between the outer and inner shells 1 and 2 has been attained. This advantage was made possible through arrangement in the clearance 12 of the mesh 14, which represents an additional surface of crystallization, and also because the entire volume of the crystallizing braze material was split into a plurality of microvolumes confined by the cells of the mesh 14. Crystallization under such conditions takes place virtually without shrinkage of the solder. In addition, when carrying out the method described in the last Example, less expensive and more easy to fabricate braze materials were used. There is no doubt that it is much easier to make a braze material by melting an alloy of required composition and casting it into a mould than to make a foil thereof. Foil fabrication necessitates many working operations, which include rolling and thermal treatments to eliminate cold hardening. Furthermore, there are alloys, which are not available in the form of a foil, particulary because of their poor deformability. The method described in Example 2 allows the use of such alloys, which substantially expands the range of braze materails to be used for carrying out the proposed method.

The method described in Example 2 was preceded by experiments made on specimens allowing brazing with mesh 14 of various types and size insertable between the walls of carbon and stainless steel.

Values of minimum-non capillary clearances for the same base materials and braze materials used have been also obtained through these experiments and are represented, along with the results of experimental brazing, in Table 2.

TABLE 2

| No. | Braze Metal composition, wt. % | Smallest non-capillary clearance, mm | Mesh parameters | | Shear strength of the brazed joint, MPa |
|---|---|---|---|---|---|
| | | | wire dia, mm | cell size, mm | |
| 1 | manganese 60% nickle 40% | 0.36 | 0.36 | 1.4 | $\frac{286 - 348}{329}$ |
| 2 | manganese 60% nickle 40% | " | 0.36 | 0.6 | $\frac{382 - 401}{396}$ |
| 3 | manganese 60% nickle 40% | " | 0.40 | 0.8 | $\frac{373 - 393}{386}$ |
| 4 | manganese 60% nickle 40% | " | 1.0 | 2.0 | $\frac{300 - 321}{319}$ |
| 5 | manganese 60% nickle 40% | " | 1.2 | 6.0 | $\frac{135 - 290}{159}$ |
| 6 | manganese 60% nickle 40% | " | 1.5 | 3.0 | $\frac{166 - 248}{180}$ |
| 7 | manganese 75% nickle 15% copper 10% | 0.32 | 0.32 | 0.6 | $\frac{377 - 400}{392}$ |
| 8 | manganese 75% nickle 15% copper 10% | " | 0.36 | 0.6 | $\frac{366 - 389}{381}$ |

TABLE 2-continued

| No. | Braze Metal composition, wt. % | Smallest non-capillary clearance, mm | Mesh parameters wire dia, mm | Mesh parameters cell size, mm | Shear strength of the brazed joint, MPa |
|---|---|---|---|---|---|
| 9 | manganese 75% nickel 15% copper 10% | " | 1.0 | 2.0 | $\frac{296 - 320}{316}$ |
| 10 | manganese 75% nickel 15% copper 10% | " | 1.2 | 6.0 | $\frac{109 - 226}{148}$ |
| 11 | copper | 0.25 | 0.25 | 0.5 | $\frac{389 - 401}{393}$ |
| 12 | copper | " | 0.25 | 1.0 | $\frac{334 - 351}{342}$ |
| 13 | copper | " | 0.36 | 0.6 | $\frac{352 - 370}{369}$ |
| 14 | copper | " | 1.0 | 2.0 | $\frac{165 - 300}{288}$ |
| 15 | copper | " | 1.2 | 6.0 | $\frac{121 - 190}{139}$ |

The data represented in Table 2 confirm that for ensuring the maximum possible strength of brazed joint the size of the mesh 14 needs to be equal to the smallest possible non-capillary clearances or to exceed this clearance up to the limits providing the necessary minimum strength of the joint. It is to be noted that an increase in the width and volume of the clearance 12 results in an unjustified increase in braze material consumption. Table 2 offers the optimum diameters of steel wire of the mesh 14 for different braze materials.

For example, when using copper as the braze material, the diameter of the steel wire is to be within a range from 0.25 to 1 mm.

When using as braze material an alloy containing 60% manganese and 40% nickel, the diameter of the steel wire should preferably range from 0.36 to 1.2 mm.

When an alloy containing 75% manganese, 15% nickel and 10% copper is used as braze material, the diameter of the steel wire should preferably be within a range from C,32 to 1.2 mm. Such diameters of the steel wire ensure the highest strength of the brazed joint.

The proposed method is characterized by high strength of brazed joints and can dispense with the use of braze material in the form of foil, which allows the use of hard-to-deform braze materials, and consequently expands the range of braze materials to be employed.

Furthermore, placing the steel wire mesh 14 in the clearance 12 allows one to retain the size of the clearance 12 meeting the requirement of the least non-capillary clearance, which, on the one hand, ensures penetration of molten braze material through the height of this clearance 12, and on the other hand, prevents excessive consumption of the braze material.

The present invention makes it possible to increase the reliability of the method of brazing, simplify the assembly of outer and inner shells, and of heating these shells for brazing thanks to tight arrangement of the inner shell inside the outer shell preventing their mutual displacement during brazing. The method also affords one to improve the quality of brazed joint because pockets and voids are less likely to appear in the clearance between the shells and due to dispensing with vacuum evaporation during brazing.

We claim:

1. A method of brazing of an outer carbon steel sheet and an inner stainless steel shell comprising the steps of:
    forming said inner shell having ends and longitudinal edges by rolling up a sheet of stainless steel material in an overlap fashion so that the portions of said sheet material adjacent said longitudinal edges overlap to define a contact zone therebetween;
    placing said rolled up sheet material and braze material inside the outer shell with a clearance between the inner surface of said outer shell and the outer surface of the inner shell;
    placing a braze material onto the outer surface of the said rolled up sheet material so that it engages both the inner surface of said outer shell and the outer surface of the inner shell;
    forcing said rolled up sheet material to said inner surface of the outer shell until its longitudinal edges are butted and said contact zone is eliminated;
    joining said longitudinal edges of said sheet material by a longitudinal weld to obtain said inner shell;
    evacuating air from said clearance;
    joining said ends of said inner and outer shells by circular vacuum-tight corner welds;
    heating said outer shell with said inner shell mounted therein for brazing; and
    cooling said outer shell, said inner surface of which is joined by brazing with said inner shell.

2. A method as claimed in claim 1, further comprising the step of joining said ends of the outer and inner shells by vacuum-tight circular corner welds having legs, one of which legs adjoining the end of said inner shell being equal in size to at least one thickness of the wall of said inner shell, and
    the other said leg adjoining said inner surface of said outer shell being equal in size to at least twice the thickness of said wall of said inner shell.

3. A method as claimed in claim 1, in which said outer shell is arranged vertically, comprising the steps of:
    arranging said rolled up sheet material with said clearance inside said outer shell having an upper cavity;
    placing a braze material in said upper cavity of said outer shell in order to make it flow into said clearance during brazing through the whole length of the clearance;
    placing a mesh of steel wire in said clearance before weld-joining said ends of the outer and inner shells, the diameter of the steel wire of said mesh being at least 0.25 mm; and
    evacuating air from said clearance only prior to heating for brazing.

4. A method as claimed in claim 2, in which said outer shell is arranged vertically, comprising the steps of:
    arranging said rolled up sheet material with said annular clearance inside said outer shell having an upper cavity;
    placing a braze material in said upper cavity of said outer shell in order to make it flow into said clearance through its whole length during brazing;
    placing a mesh of steel wire in said clearance before weld-joining said ends of said outer and inner shells, the diameter of the steel wire being at least 0.25 mm; and
    evacuating air from said annular clearance only prior to heating for brazing.

5. A method as claimed in claim 3, including the step of placing said mesh of steel wire having a diameter selected within a range from 0.25 mm to 1 mm, while using copper as the braze material.

6. A method as claimed in claim 3, including the step of placing said mesh of steel wire having a diameter selected within a range from 0.36 mm to 1.2 mm, while using an alloy containing by weight 60% manganese and 40% nickel as the braze material.

7. A method as claimed in claim 3, including the step of placing said mesh of steel wire having a diameter selected within a range from 0.32 mm to 1 mm, while using an alloy containing by weight 75% manganese, 15% nickel and 10% copper as braze material.

8. A method as claimed in claim 4, including the step of placing said mesh of steel wire having a diameter selected within a range from 0.25 mm to 1 mm, while using copper as braze material.

9. A method as claimed in claim 4, including the step of placing said mesh of steel wire having a diameter selected within a range from 0.36 mm to 1.2 mm, while using an alloy containing by weight 60% manganese and 40% nickel as braze material.

10. A method as claimed in claim 4, including the step of placing said mesh of steel wire having a diameter selected within a range of 0.32 mm to 1 mm, while use an alloy containing by weight 75% manganese, 15% nickel and 10% copper as braze material.

* * * * *